US010715310B2

(12) United States Patent
Jain et al.

(10) Patent No.: US 10,715,310 B2
(45) Date of Patent: Jul. 14, 2020

(54) METHOD AND APPARATUS FOR DECRYPTING DATA BLOCKS OF A PATTERN-ENCRYPTED SUBSAMPLE

(71) Applicant: QUALCOMM Incorporated, San Diego, CA (US)

(72) Inventors: Shalaj Jain, San Diego, CA (US); Angus Wong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 15/973,469

(22) Filed: May 7, 2018

(65) Prior Publication Data

US 2019/0342071 A1 Nov. 7, 2019

(51) Int. Cl.
*H04L 9/06* (2006.01)
*G06F 7/08* (2006.01)

(52) U.S. Cl.
CPC .............. *H04L 9/0618* (2013.01); *G06F 7/08* (2013.01)

(58) Field of Classification Search
CPC ............ H04L 9/0618; H04N 21/42623; H04N 21/4348; H04N 21/44055; G06F 7/08
See application file for complete search history.

(56) References Cited

U.S. PATENT DOCUMENTS

| 7,751,563 B2 * | 7/2010 | Candelore ................ H04K 1/00 380/201 |
| 8,725,788 B2 | 5/2014 | Swaminathan et al. |
| 9,515,818 B2 | 12/2016 | Kindarji et al. |

| 2002/0196939 A1 * | 12/2002 | Unger .................... H04N 7/162 380/216 |

(Continued)

FOREIGN PATENT DOCUMENTS

WO   WO 2019/008174 A1 *  1/2019

OTHER PUBLICATIONS

Bergeron C., et al., "Comments on CENC Selective Encryption", 119. MPEG Meeting, Jul. 17, 2017-Jul. 21, 2017, TORINO; (Motion Picture Expert Group or No. ISO/IEC JTC1/SC29/WG11), m41022, Jul. 12, 2017 (Jul. 12, 2017), XP030069365, 14 Pages (paragraph [02.1]—paragraph [02.2] paragraph [04.1] paragraph [0A.1]—paragraph [0A.2]).

(Continued)

*Primary Examiner* — Minh Dinh
(74) *Attorney, Agent, or Firm* — Loza & Loza LLP

(57) ABSTRACT

A method in a pattern encryption protection scheme may efficiently decrypt data blocks in a timely manner. In the method, a processor may receive a frame of data blocks. The frame may include a plurality of pattern-encrypted subsamples, and each pattern-encrypted subsample may include one or more encrypted data blocks and one or more unencrypted data blocks in accordance with a predetermined pattern. The processor may determine a first buffer portion and a second buffer portion based on a number of the data blocks in the frame and the predetermined pattern. The processor may sort the data blocks by copying the encrypted data blocks into the first buffer portion and by copying the unencrypted data blocks into the second data buffer portion. The processor may perform a decryption call to a crypto engine to generate corresponding decrypted data blocks using the sorted encrypted data blocks in the first buffer portion.

27 Claims, 10 Drawing Sheets

(56) References Cited

U.S. PATENT DOCUMENTS

| | | |
|---|---|---|
| 2007/0016802 A1 | 1/2007 | Wingert et al. |
| 2009/0327750 A1 | 12/2009 | Wu et al. |
| 2012/0134496 A1 | 5/2012 | Farkash et al. |
| 2013/0156186 A1* | 6/2013 | Candelore ............ H04N 7/1675 380/210 |
| 2014/0161196 A1 | 6/2014 | Culebro et al. |
| 2015/0106630 A1 | 4/2015 | Kottilingal et al. |
| 2016/0070887 A1* | 3/2016 | Wu .................... G06F 21/10 713/189 |
| 2017/0109503 A1 | 4/2017 | Mangalore et al. |
| 2017/0164046 A1 | 6/2017 | Shamoon et al. |
| 2017/0171610 A1* | 6/2017 | Nair .................. H04N 21/2362 |

OTHER PUBLICATIONS

Hughes K., "Text of ISO/IEC 23001-7:201X FDIS 3rd edition", 112. MPEG Meeting, Jun. 22, 2015-Jun. 26, 2015, Warsaw, (Motion Picture Expert Group ISO/IEC JTC1/SC29/WG11), No. N15501, Oct. 16, 2015 (Oct. 16, 2015), XP030022215, pp. 1-33 (p. 7, paragraph 4.2—p. 9, paragraph p. 14, paragraph 9.1, p. 15 p. 16, paragraph 9.3—p. 17 p. 18, paragraph 9.5.1—p. 24, paragraph 9.6.2 p. 26, paragraph 10.3—p. 28, paragraph 10.4.2).
International Search Report and Written Opinion—PCT/US2019/027803—ISA/EPO—dated Jun. 28, 2019.
"Canim N., et al., "Design and Analysis of Querying Encrypted Data in Relational Databases", Proceedings of the 21st Annual IFIP WG 11.3 Working Conference on Data and Applications Security, 2007, pp. 177-194."

* cited by examiner

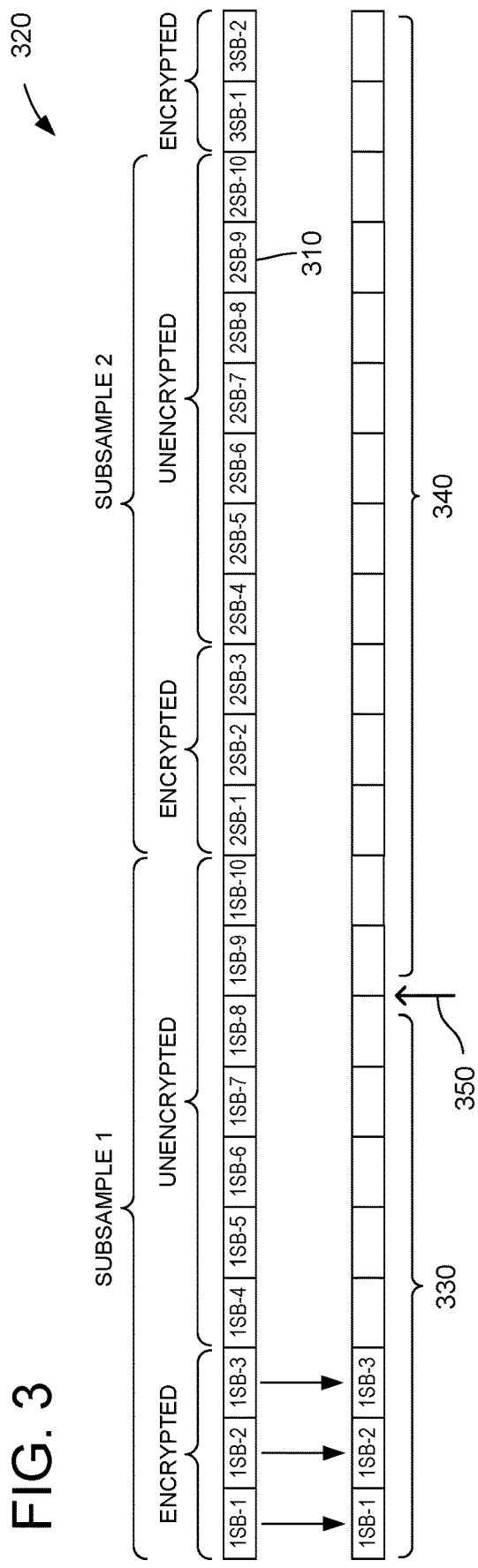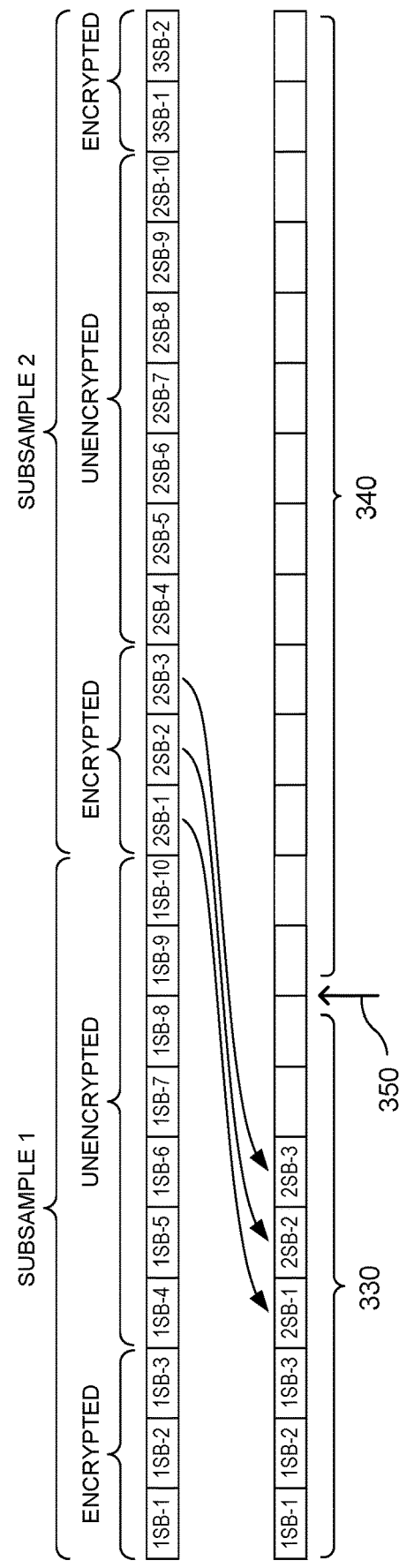

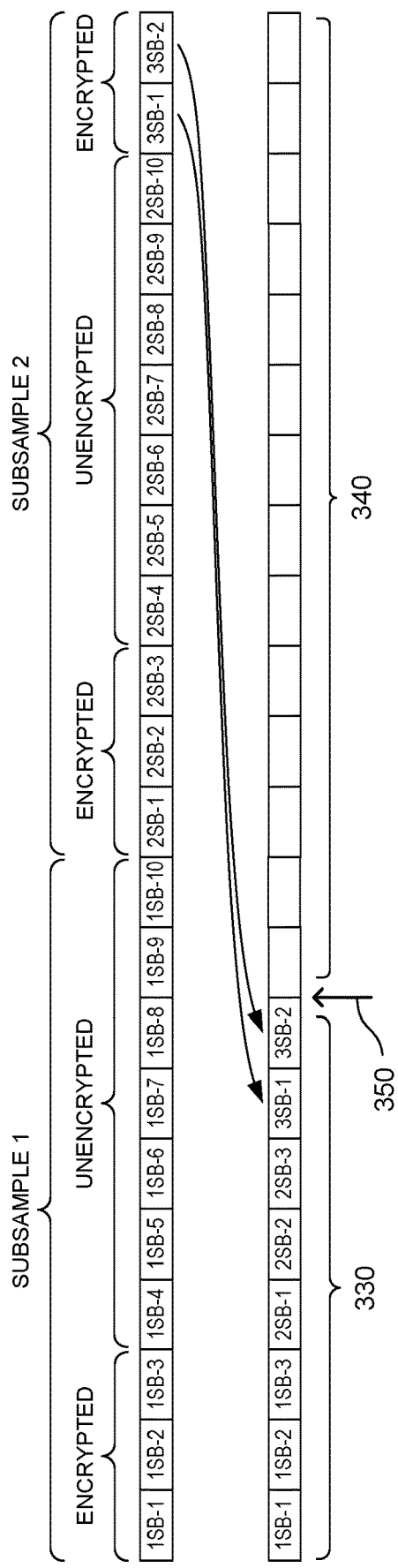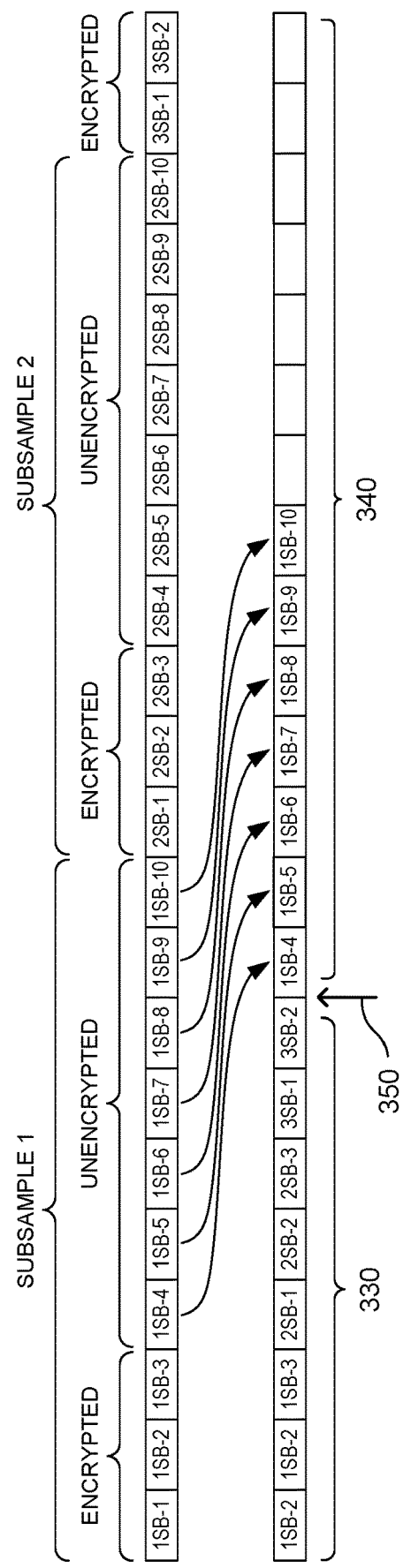

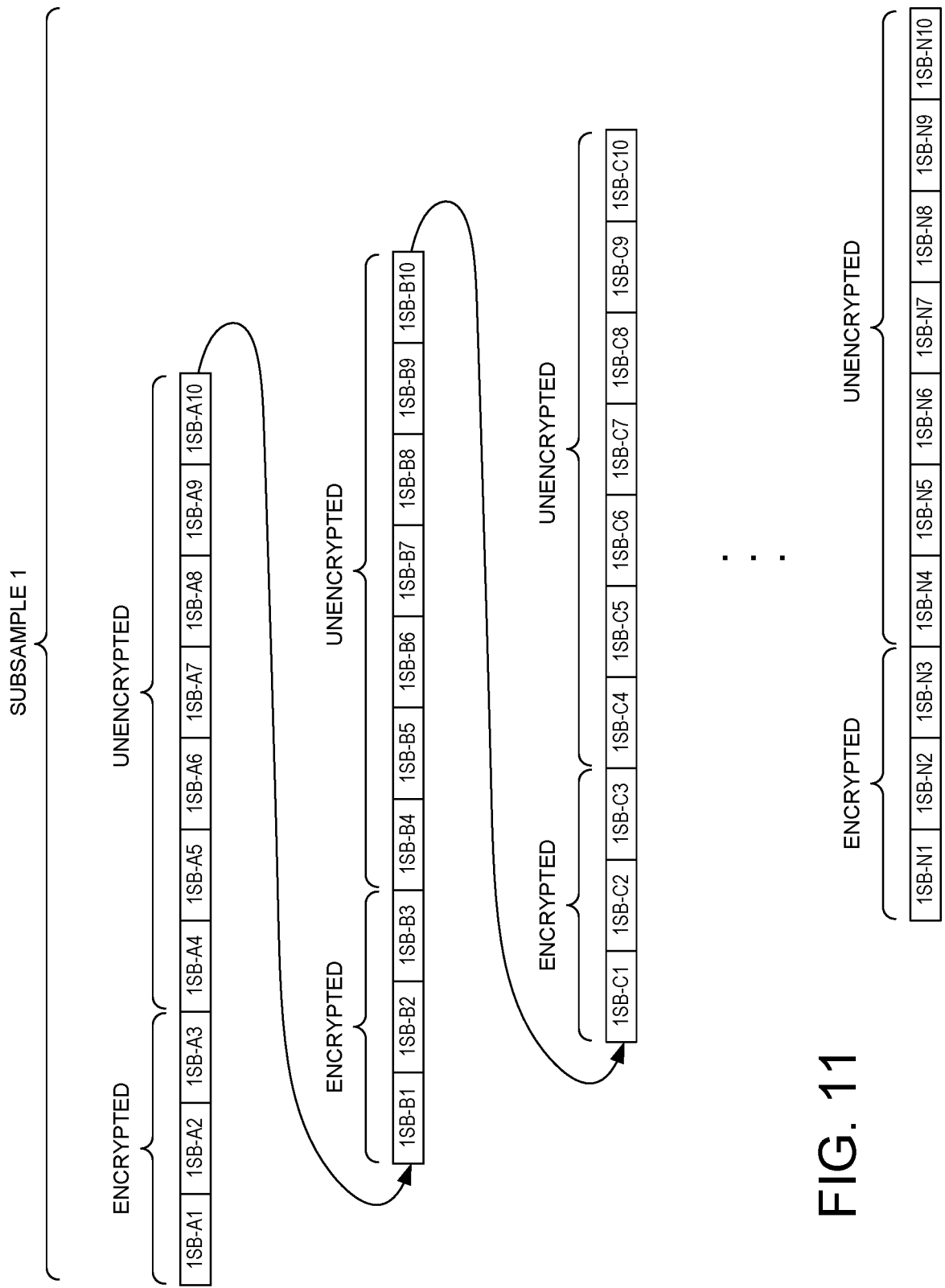

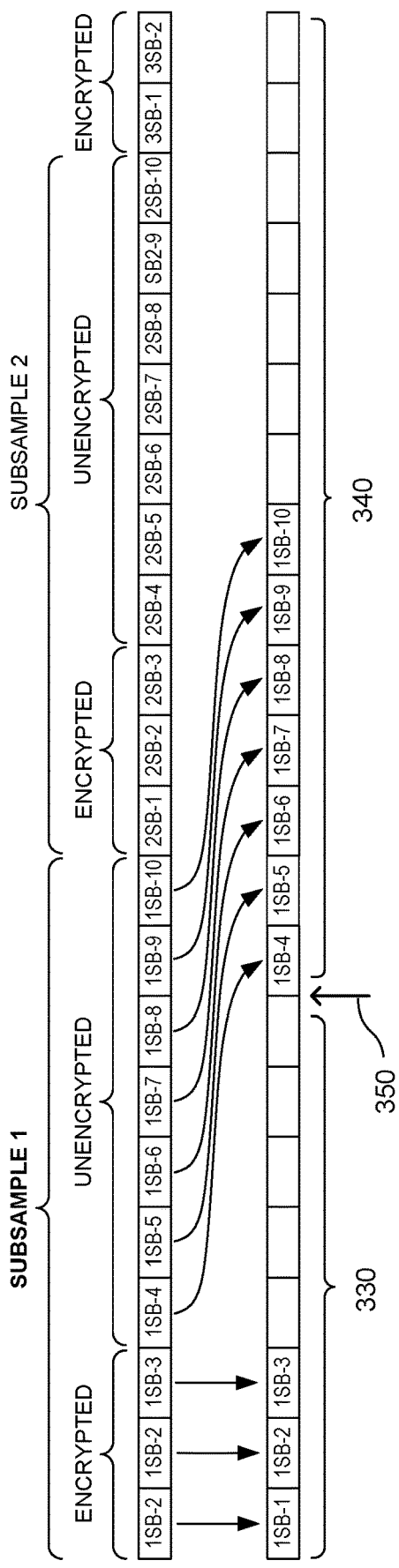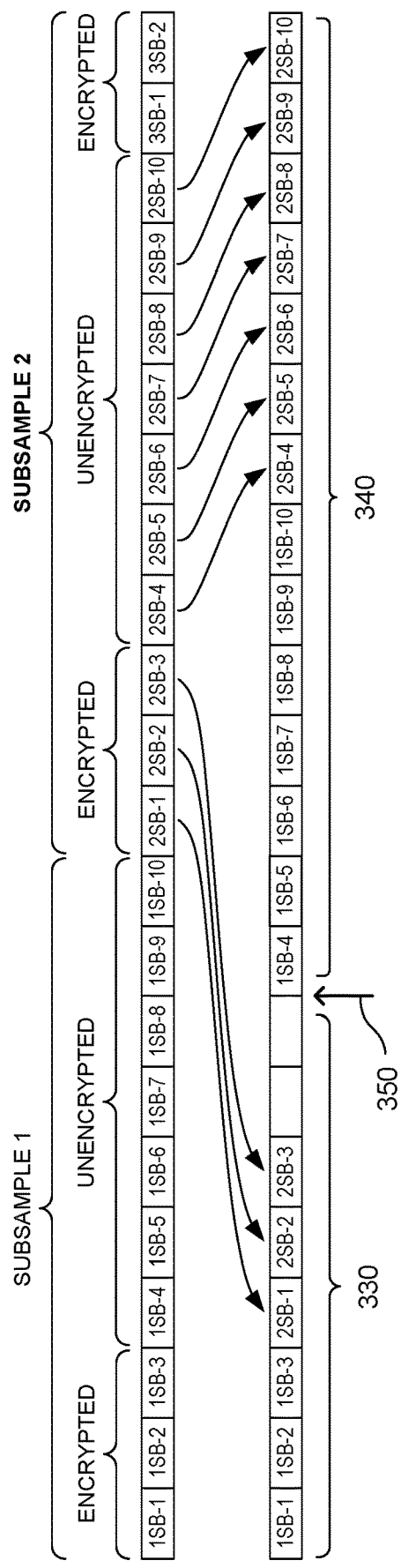

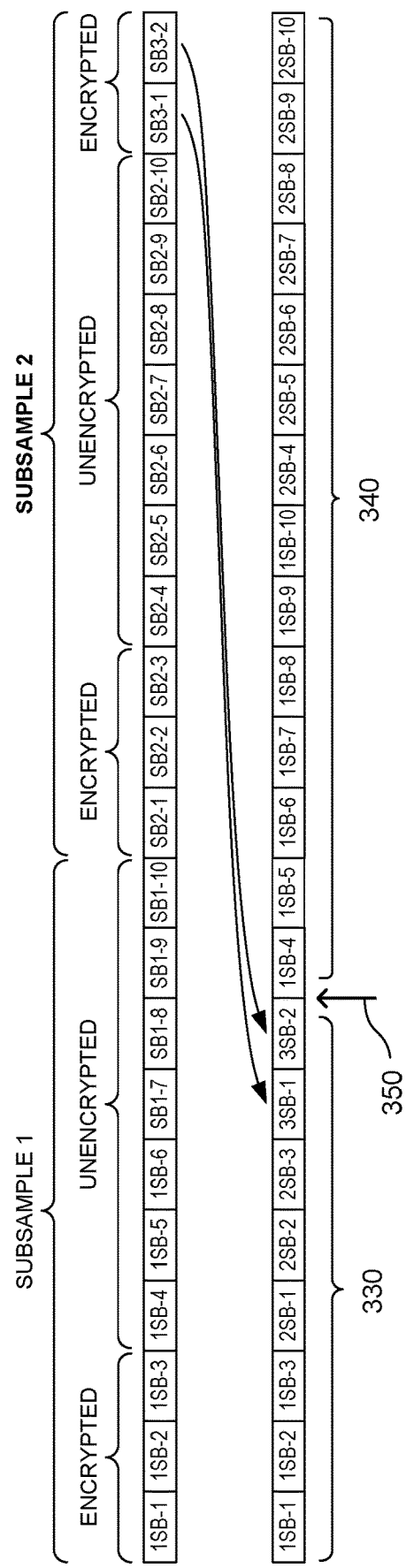

METHOD AND APPARATUS FOR DECRYPTING DATA BLOCKS OF A PATTERN-ENCRYPTED SUBSAMPLE

BACKGROUND

Field

The present invention relates generally to decryption of data blocks in a pattern encryption protection scheme.

Background

The ISO/IEC 23001-7 standard details common encryption formats for use in files in accordance with the ISO base media file format as detailed in the ISO/IEC 14496-12 standard. The third edition of the ISO/IEC 23001-7 standard specifies four protection schemes of common encryption: cenc, cbc1, cens, and cbcs. The cenc scheme uses AES-CTR-128 mode full sample and video Network Abstraction Layer (NAL) Subsample encryption. The cbc1 scheme uses AES-CBC mode full sample and video NAL Subsample encryption. The cens scheme uses AES-CTR-128 mode partial video NAL pattern encryption. The cbcs scheme uses AES-CBC mode partial video NAL pattern encryption. The cbcs and cens protection schemes, which use pattern encryption, were added in the third edition of the ISO/IEC 23001-7 standard.

In pattern encryption, only a fraction (e.g., 1 of 10) of the data blocks within protected video subsamples are encrypted. The intent of pattern encryption was to reduce the computational power required by devices to decrypt video tracks. Unfortunately, the intended reduction in computational power may be accompanied by significant decryption delays.

There is therefore a need for techniques for decrypting data blocks, of a pattern encryption protection scheme, in an efficient and timely manner.

SUMMARY

An aspect of the present invention may reside in a method for decrypting data blocks in a pattern encryption protection scheme using a processor which may be implemented in hardware. In the method, the processor may receive a frame of data blocks. The frame may include a plurality of pattern-encrypted subsamples, and each pattern-encrypted subsample may include one or more encrypted data blocks and one or more unencrypted data blocks in accordance with a predetermined pattern. The processor may determine a first buffer portion and a second buffer portion based on a number of the data blocks in the frame and the predetermined pattern. The processor may sort the data blocks by copying the encrypted data blocks into the first buffer portion and by copying the unencrypted data blocks into the second data buffer portion. The processor may perform a decryption call to a crypto engine to generate corresponding decrypted data blocks using the sorted encrypted data blocks in the first buffer portion.

In more detailed aspects of the invention, the processor may store the decrypted data blocks in the first buffer portion in place of the encrypted data blocks, and may reverse sort the decrypted data blocks in the first buffer portion and the unencrypted data blocks in the second data buffer portion by copying the decrypted data blocks and the unencrypted data blocks to a sort buffer in accordance with the predetermined data pattern. The predetermined pattern may be repeated a predetermined number of times in each pattern-encrypted subsample.

In other more detailed aspects of the invention, the encrypted data blocks may be copied into adjacent storage locations in the first buffer portion in accordance with an order of the encrypted data blocks in the frame, and the unencrypted data blocks may be copied into adjacent storage locations in the second buffer portion in accordance with an order of the unencrypted data blocks in the frame. Determining the first buffer portion and the second buffer portion may include calculating a sort divider between storage locations of a buffer based on a number of the data blocks in the frame and the predetermined pattern.

In other more detailed aspects of the invention, the crypto engine may be a hardware crypto engine operating in a non-pattern mode. Also, the crypto engine may be in a secure execution environment, and may be implemented using software in the secure execution environment.

Another aspect of the invention may reside in an apparatus, comprising: means for receiving a frame of data blocks, wherein the frame includes a plurality of pattern-encrypted subsamples, and each pattern-encrypted subsample includes one or more encrypted data blocks and one or more unencrypted data blocks in accordance with a predetermined pattern; means for determining a first buffer portion and a second buffer portion based on a number of the data blocks in the frame and the predetermined pattern; means for sorting the data blocks by copying the encrypted data blocks into the first buffer portion and by copying the unencrypted data blocks into the second data buffer portion; and means for performing a decryption call to a crypto engine to generate corresponding decrypted data blocks using the sorted encrypted data blocks in the first buffer portion.

Another aspect of the invention may reside in an apparatus, comprising: a processor configured to: receive a frame of data blocks, wherein the frame includes a plurality of pattern-encrypted subsamples, and each pattern-encrypted subsample includes one or more encrypted data blocks and one or more unencrypted data blocks in accordance with a predetermined pattern; determine a first buffer portion and a second buffer portion based on a number of the data blocks in the frame and the predetermined pattern; sort the data blocks by copying the encrypted data blocks into the first buffer portion and by copying the unencrypted data blocks into the second data buffer portion; and perform a decryption call to a crypto engine to generate corresponding decrypted data blocks using the sorted encrypted data blocks in the first buffer portion.

Another aspect of the invention may reside in a computer-readable medium, comprising: code for causing a computer to receive a frame of data blocks, wherein the frame includes a plurality of pattern-encrypted subsamples, and each pattern-encrypted subsample includes one or more encrypted data blocks and one or more unencrypted data blocks in accordance with a predetermined pattern; code for causing the computer to determine a first buffer portion and a second buffer portion based on a number of the data blocks in the frame and the predetermined pattern; code for causing the computer to sort the data blocks by copying the encrypted data blocks into the first buffer portion and by copying the unencrypted data blocks into the second data buffer portion; and code for causing the computer to perform a decryption call to a crypto engine to generate corresponding decrypted data blocks using the sorted encrypted data blocks in the first buffer portion.

BRIEF DESCRIPTION OF THE DRAWINGS

FIG. 3 is a first schematic diagram of a technique for sorting data blocks of pattern-encrypted subsamples for decryption, according to the present invention.

FIG. 4 is a second schematic diagram of a technique for sorting data blocks of pattern-encrypted subsamples for decryption, according to the present invention.

FIG. 5 is a third schematic diagram of a technique for sorting data blocks of pattern-encrypted subsamples for decryption, according to the present invention.

FIG. 6 is a fourth schematic diagram of a technique for sorting data blocks of pattern-encrypted subsamples for decryption, according to the present invention.

FIG. 11 is a schematic diagram showing a predetermined pattern repeated in a pattern-encrypted subsample, according to the present invention.

FIG. 13 is a first schematic diagram of another technique for sorting data blocks of pattern-encrypted subsamples for decryption, according to the present invention.

FIG. 14 is a second schematic diagram of another technique for sorting data blocks of pattern-encrypted subsamples for decryption, according to the present invention.

FIG. 15 is a third schematic diagram of another technique for sorting data blocks of pattern-encrypted subsamples for decryption, according to the present invention.

DETAILED DESCRIPTION

Figure 1:
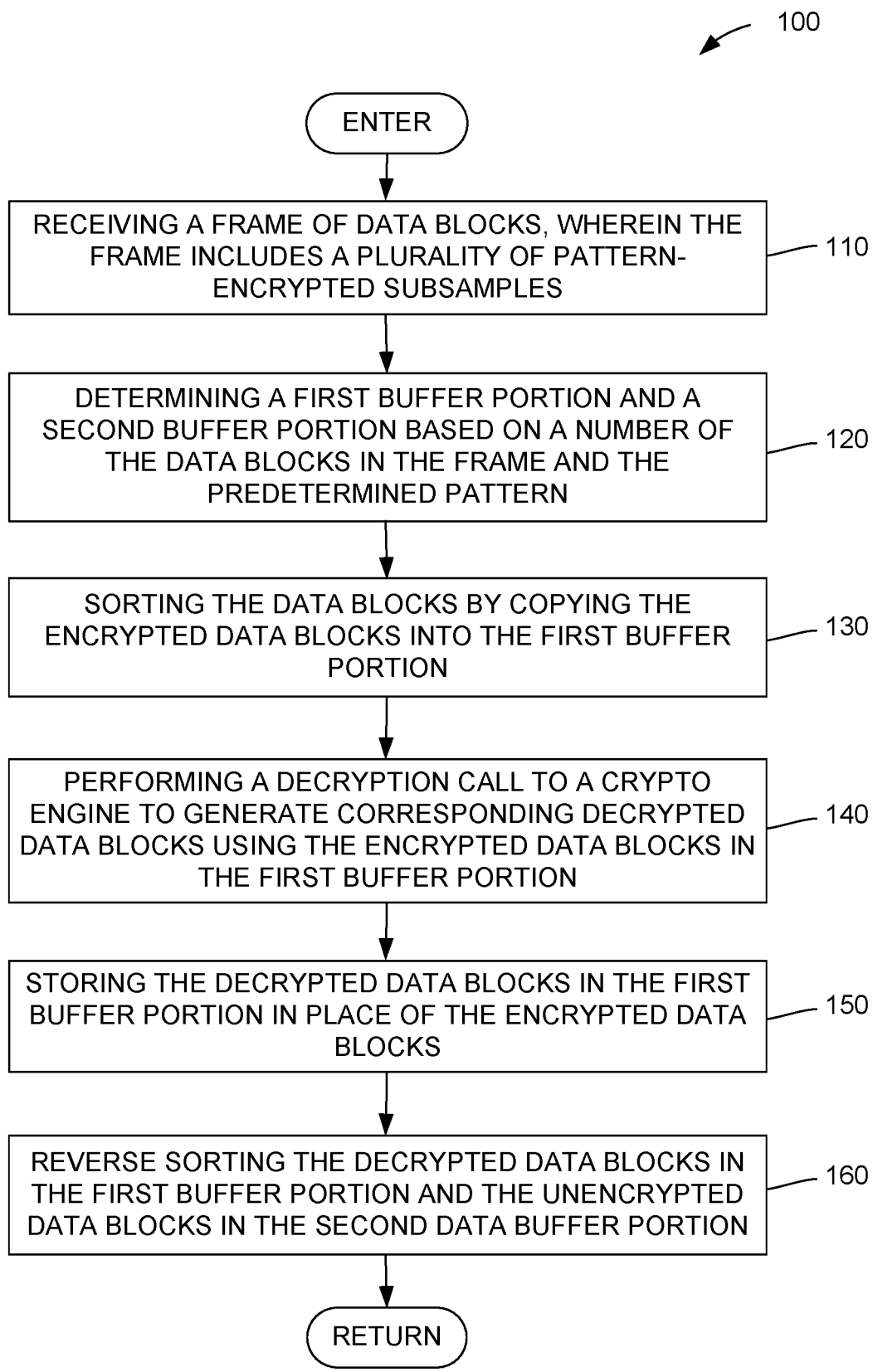
FIG. 1 is a flow diagram of a method for decrypting data blocks in a pattern-encryption protection scheme, according to the present invention.
Figure 2:
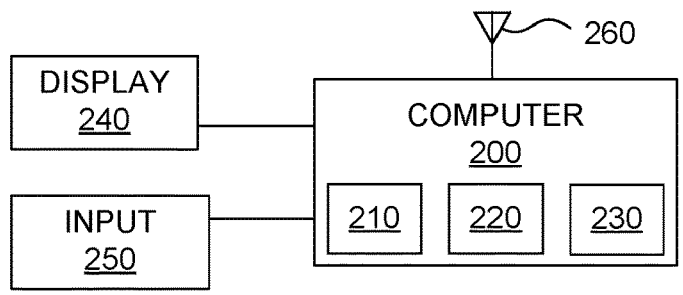
FIG. 2 is a block diagram of a computer including a processor and a memory.

The word "exemplary" is used herein to mean "serving as an example, instance, or illustration." Any embodiment described herein as "exemplary" is not necessarily to be construed as preferred or advantageous over other embodiments.

With reference to FIGS. 1-8, an aspect of the present invention may reside in a method 100 (FIG. 1) for decrypting data blocks 310 in a pattern encryption protection scheme using a processor 210 which may be implemented in hardware. In the method, the processor may receive a frame 320 of data blocks (step 110) The frame may include a plurality of pattern-encrypted subsamples, and each pattern-encrypted subsample may include one or more encrypted data blocks (e.g., 1SB-1 through 1SB-3) and one or more unencrypted data blocks (e.g., 1SB-4 through 1SB-10) in accordance with a predetermined pattern. The processor may determine a first buffer portion 330 and a second buffer portion 340 based on a number of the data blocks in the frame and the predetermined pattern (step 120). The processor may sort the data blocks by copying the encrypted data blocks into the first buffer portion (e.g., FIGS. 3, 4 and 5) (step 130), and by copying the unencrypted data blocks into the second data buffer portion (e.g., FIGS. 6 and 7). The processor may perform a decryption call to a crypto engine 220 to generate corresponding decrypted data blocks 810 using the sorted encrypted data blocks in the first buffer portion (FIG. 8) (step 140).

Figure 9:
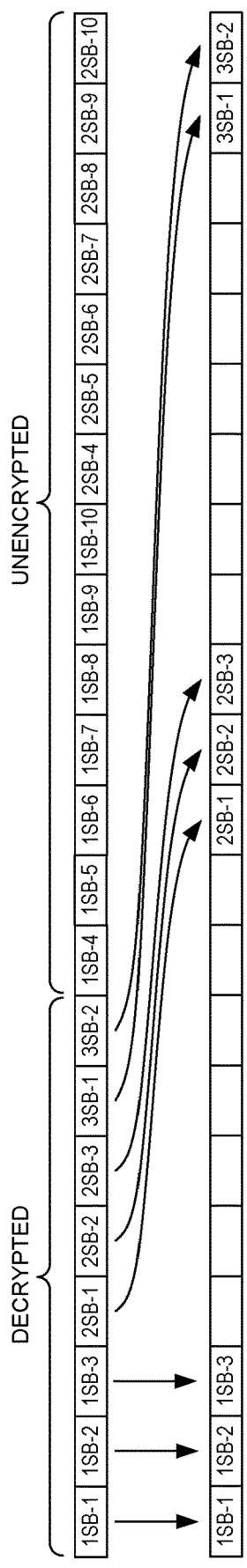
FIG. 9 is a first schematic diagram of showing reverse sorting of data blocks, according to the present invention.
Figure 10:
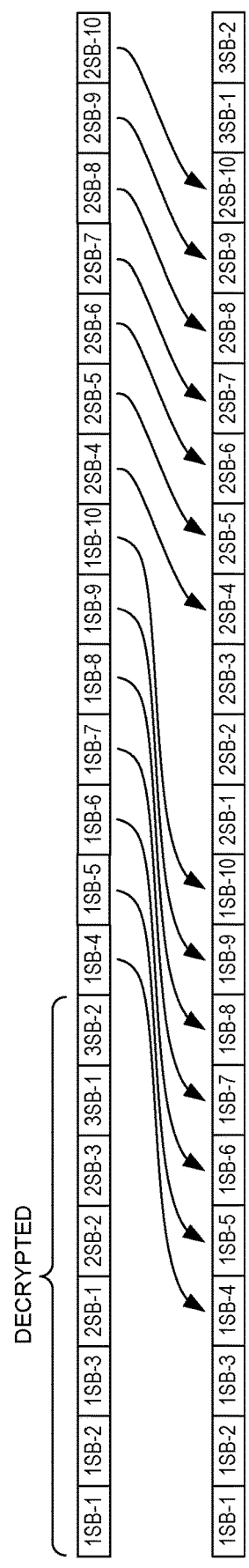
FIG. 10 is a second schematic diagram of showing reverse sorting of data blocks, according to the present invention.

With reference to FIGS. 9 and 10, the processor 210 may store the decrypted data blocks 810 in the first buffer portion 330 in place of the encrypted data blocks (step 150), and may reverse sort the decrypted data blocks in the first buffer portion and the unencrypted data blocks in the second data buffer portion 340 by copying the decrypted data blocks and the unencrypted data blocks to a sort buffer (FIGS. 9 and 10) in accordance with the predetermined data pattern (step 160). With reference to FIG. 11, the predetermined pattern may be repeated a predetermined number of times in each pattern-encrypted subsample.

The processor 210, the crypto engine 220, and the first and second data buffer portions, 330 and 340, may be included in a user equipment (UE). The UE may comprise a computer 200 that may include the processor 210 having a secure zone system architecture, the crypto engine 220, a storage medium 230 such as memory and/or a disk drive, a display 240, an input such as a keypad 250, and one or more wireless connections 260. The memory may include the first and second data buffer portions, 330 and 340. The secure zone system architecture may comprise a TrustZone® (TZ) in accordance with the ARM security technology available from ARM Limited, of Cambridge, Great Britain.

According to the ISO/IEC 23001-7 standard, subsample encryption divides each sample into one or more contiguous subsamples. Each subsample has an unprotected part followed by a protected part. Pattern encryption utilizes a pattern of encrypted and unencrypted ("skipped") data blocks over the protected range of a subsample.

Video streams encrypted with any of the above common encryption schemes need to be decrypted in a Trusted [Execution] Environment (TEE), such as the TrustZone® in the ARM architecture. The TEE may be either hardware crypto engine or software running in ARM's TrustZone®, which prevents higher level operating system (HLOS) access to decrypted data.

However, decrypting each data block separately is very inefficient with a hardware crypto engine (HWCE) because of a high number of calls to the HWCE. A predicate (if/else) would determine the skipped data blocks from the encrypted data blocks. Then a call would be made to the HWCE for the encrypted data blocks. These HWCE operations are relatively inefficient. The round-trip time for each HWCE call for the encrypted data blocks is generally much longer than the decryption time. Also, each loop through the pattern would not be efficiently optimized by a compiler because the predicate (if/else) must be determined at runtime.

An example may be reviewed with reference to the predetermined pattern of three (3) encrypted data blocks and seven (7) skipped data blocks of a cens description for twenty (22) data blocks, shown in FIG. 3. The adjacent encrypted data blocks 1SB-1 through 1SB-3, 2SB-1 through 2SB-3, and 3SB-1 through 3SB-2, are each separated by skipped data blocks. Thus, for this example, three decryption calls (one for each set of the adjacent encrypted data blocks) would need to be made to the HWCE to decrypt the encrypted data blocks.

Note that the ratio in the predetermined pattern of encrypted data block and skipped data blocks may be one (1)

and (9), two (2) and eight (8), etc. Also, as shown in FIG. 11, the predetermined pattern may be repeated N times in a subsample.

The present invention relates to coalescing the encrypted data blocks together and making one decryption call to the HWCE. Advantageously, this may allow efficient and timely handling of cens and cbcs protected data in a TEE using a HWCE running in cenc or cbc1 mode. Also, the predetermined pattern (ratio) of encrypted data blocks and skipped data blocks in the original data is known, so a predicate (if/else) is not needed because the loop parameters are known at compile time.

In an aspect of the invention, determining the first buffer portion 330 and the second buffer portion 340 may include calculating a sort divider (SD) 350 between storage locations of an output buffer based on a number of the data blocks 310 in the frame 320 and the predetermined pattern. The sort divider location 350 in the output buffer may be calculated based on the number of encrypted data blocks and skipped data blocks. The buffer portions and the output buffer may reside in the memory 230.

The encrypted data blocks may be copied into adjacent storage locations in the first buffer portion 330 in accordance with an order of the encrypted data blocks in the frame 320, and the unencrypted/skipped data blocks also may be copied into adjacent storage locations in the second buffer portion 340 in accordance with an order of the unencrypted data blocks in the frame. In an aspect, a first loop may copy the encrypted data blocks into the first buffer portion 330, and then a second loop may copy the skipped data blocks into the second buffer portion 340, such that all of the encrypted data blocks are adjacent, and all of the skipped data blocks are adjacent.

Figure 7:
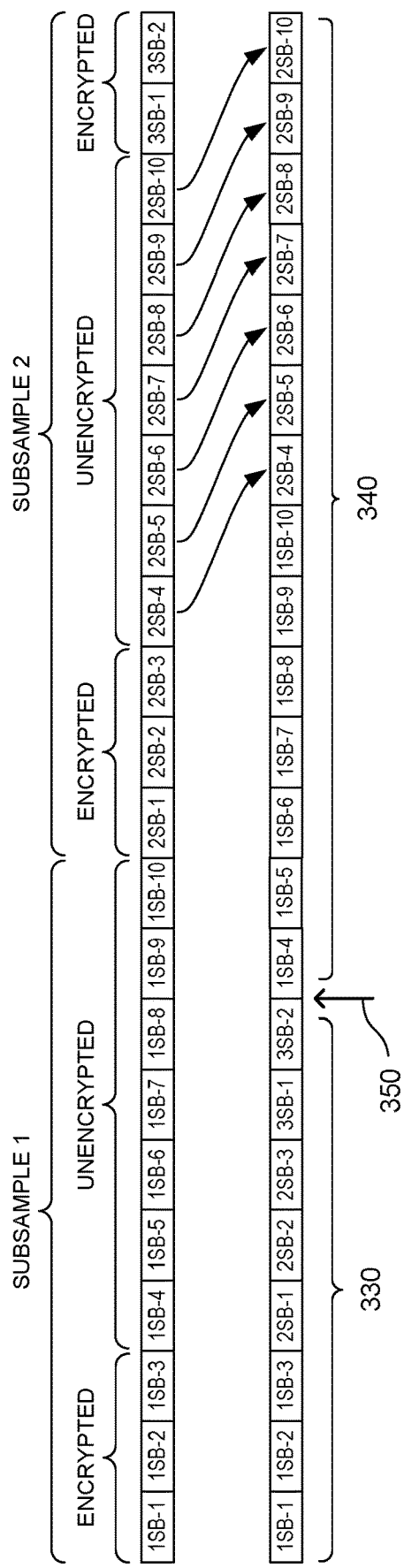
FIG. 7 is a fifth schematic diagram of a technique for sorting data blocks of pattern-encrypted subsamples for decryption, according to the present invention.

More specifically, the first adjacent encrypted data blocks, 1SB-1, 1SB-2 and 1SB-3, may be copied into the first buffer portion 330, as shown in FIG. 3. Next, the second adjacent encrypted data blocks, 2SB-1, 2SB-2 and 2SB-3, may be copied into the first buffer portion, as shown in FIG. 4. Next, the third adjacent encrypted data blocks, 3SB-1 and 3SB-2, may be copied into the first buffer portion, as shown in FIG. 5. Thus, the encrypted data blocks may be contiguous in the first buffer portion. Then the unencrypted/skipped data blocks, 1SB-4 through 1SB-10, may be copied into the second buffer portion 340 as shown in FIG. 6. Next, the skipped data blocks, 2SB-4 through 2SB-10, may be copied into the second buffer portion as shown in FIG. 7.

Figure 8:
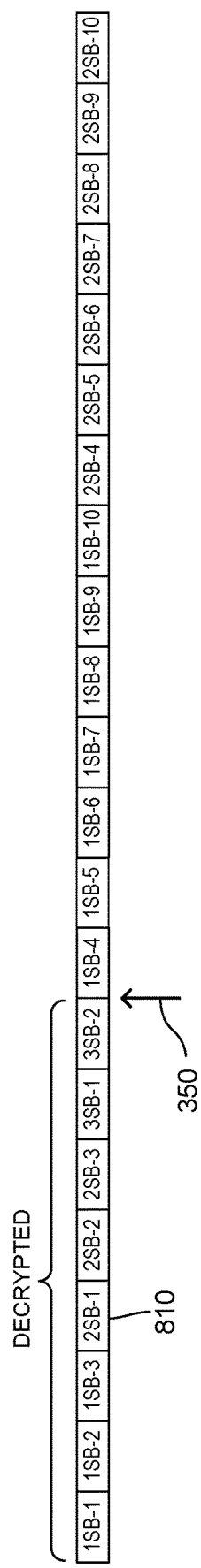
FIG. 8 is a schematic diagram showing sorted and decrypted data blocks, according to the present invention.

The sorted/adjacent encrypted data blocks may be decrypted using one decryption call to the HWCE resulting in the respective adjacent decrypted data blocks 810, as shown in FIG. 8. Using only one decryption call greatly decreases delay associated with setting up multiple decryption calls associated with unsorted encrypted data blocks in a pattern encryption scheme.

The decrypted data blocks and the skipped data blocks may be reverse sorted into their corresponding positions using a first loop for the decrypted data blocks, and a second loop for the skipped data block blocks. Again, the predetermined pattern (ratio) of decrypted data blocks and skipped data blocks is known at compile time, so the compiler can optimize each of the reverse sort loops.

The reverse sort may be performed by copying decrypted data blocks, 1SB-1, 1SB-2, 1SB-3, 2SB-1, 2SB-2, 2SB-3, 3SB-1 and 3SB-2, into the output buffer as shown in FIG. 9, and then copying the skipped data blocks 1SB-4 through 1SB-10 and 2SB-4 through 2SB-10, into the output buffer as shown in FIG. 10.

The sorting step may be implemented as follows:
Set $x=0, y=0$
Loop 1 for each (pattern repeat 'i')
  1. memcpy(output[y], input[x], n)
  2. Set $x=(n+m)*i, y=n*i$
Set $x=n, y=sd$
Loop 2 for each (pattern repeat 'i')
  1. memcpy(output[y], input[x], m)
  2. $x=(n+m)*i, y=m*i$
where n=the encryption pattern length (3 in FIG. 3), m=the skip pattern length (7 in FIG. 3), n+m=the total pattern length (10 in FIG. 3), sd=the skip divider location (4 in FIG. 3), x=the current input buffer offset, and y=the current output buffer offset.

The decryption step may be implemented as follows:
Set $x=0, y=0, IV=0$
Decrypt HWCE(Output[y], Input[x], n*
where IV is an initialization vector.

The reverse sorting step may be implemented as follows:
Set $x=sd-n, y=end-n$
E Loop 1 for each (pattern repeat 'i')
  1. memcpy(output[y], input[x], n)
  2. Set $x-=(n+m)*i, y-(n+m)*i$
Reset $x=end-m, y=end-n-m$
S Loop 2 foreach (pattern repeat 'i')
  1. memcpy(output[y], input[x], m)
  2. Set $x-=(m), y-=(n+m)$ Note that the data may be incomplete with respect to the predetermined pattern. With reference to FIG. 8, the last repetition 'i' ends with the two decrypted data blocks 3SB-1 and 3SB-2. Missing in the last pattern is another decrypted data block, followed by seven (7) skipped data blocks. The sorting/reverse sorting routines may take these situations into account with additional logic for a final iteration. The optimizations provided by these routines may be achieved in the main loops. Another call to the HWCE may be required in by the additional logic of the final iteration.

In another example, an input buffer may be 2 MBytes, and the pattern length may be 160 bytes. Accordingly, the pattern would repeat about 13107 times. Thus, the number of calls to the HWCE may be dramatically reduced.

In other more detailed aspects of the invention, the crypto engine 220 may be a HWCE operating in a non-pattern mode. Also, the crypto engine may be in a secure execution environment, and may be implemented using software in the secure execution environment.

Another aspect of the invention may reside in an apparatus, comprising: means (e.g., processor 210) for receiving a frame 320 of data blocks 310, wherein the frame includes a plurality of pattern-encrypted subsamples, and each pattern-encrypted subsample includes one or more encrypted data blocks and one or more unencrypted data blocks in accordance with a predetermined pattern; means (e.g., processor 210) for determining a first buffer portion 330 and a second buffer portion 340 based on a number of the data blocks in the frame and the predetermined pattern; means (e.g., processor 210) for sorting the data blocks by copying the encrypted data blocks into the first buffer portion and by copying the unencrypted data blocks into the second data buffer portion; and means (e.g., processor 210) for performing a decryption call to a crypto engine 220 to generate corresponding decrypted data blocks using the sorted encrypted data blocks in the first buffer portion.

In more detailed aspects of the invention, the apparatus may further comprise: means (e.g., processor 210) for storing the decrypted data blocks in the first buffer portion 330 in place of the encrypted data blocks; and means (e.g., processor 210) for reverse sorting the decrypted data blocks in the first buffer portion 330 and the unencrypted data blocks in the second data buffer portion 340 by copying the decrypted data blocks and the unencrypted data blocks to a sort buffer in accordance with the predetermined data pattern. Also, the means for determining the first buffer portion and the second buffer portion may include means (e.g., processor 210) for calculating a sort divider 350 between storage locations of a buffer based on a number of the data blocks 310 in the frame 320 and based on the predetermined pattern.

Another aspect of the invention may reside in an apparatus, comprising: a processor 210 configured to: receive a frame 320 of data blocks 310, wherein the frame includes a plurality of pattern-encrypted subsamples, and each pattern-encrypted subsample includes one or more encrypted data blocks and one or more unencrypted data blocks in accordance with a predetermined pattern; determine a first buffer portion 330 and a second buffer portion 340 based on a number of the data blocks in the frame and the predetermined pattern; sort the data blocks by copying the encrypted data blocks into the first buffer portion and by copying the unencrypted data blocks into the second data buffer portion; and perform a decryption call to a crypto engine 220 to generate corresponding decrypted data blocks using the sorted encrypted data blocks in the first buffer portion.

In more detailed aspects of the invention, the processor 210 may be further configured to: store the decrypted data blocks in the first buffer portion 330 in place of the encrypted data blocks; and reverse sort the decrypted data blocks in the first buffer portion 330 and the unencrypted data blocks in the second data buffer portion 340 by copying the decrypted data blocks and the unencrypted data blocks to a sort buffer in accordance with the predetermined data pattern.

Another aspect of the invention may reside in a computer-readable medium, comprising: code for causing a computer 200 to receive a frame 320 of data blocks 310, wherein the frame includes a plurality of pattern-encrypted subsamples, and each pattern-encrypted subsample includes one or more encrypted data blocks and one or more unencrypted data blocks in accordance with a predetermined pattern; code for causing the computer to determine a first buffer portion 330 and a second buffer portion 340 based on a number of the data blocks in the frame and the predetermined pattern; code for causing the computer to sort the data blocks by copying the encrypted data blocks into the first buffer portion and by copying the unencrypted data blocks into the second data buffer portion; and code for causing the computer to perform a decryption call to a crypto engine 220 to generate corresponding decrypted data blocks using the sorted encrypted data blocks in the first buffer portion.

Figure 12:
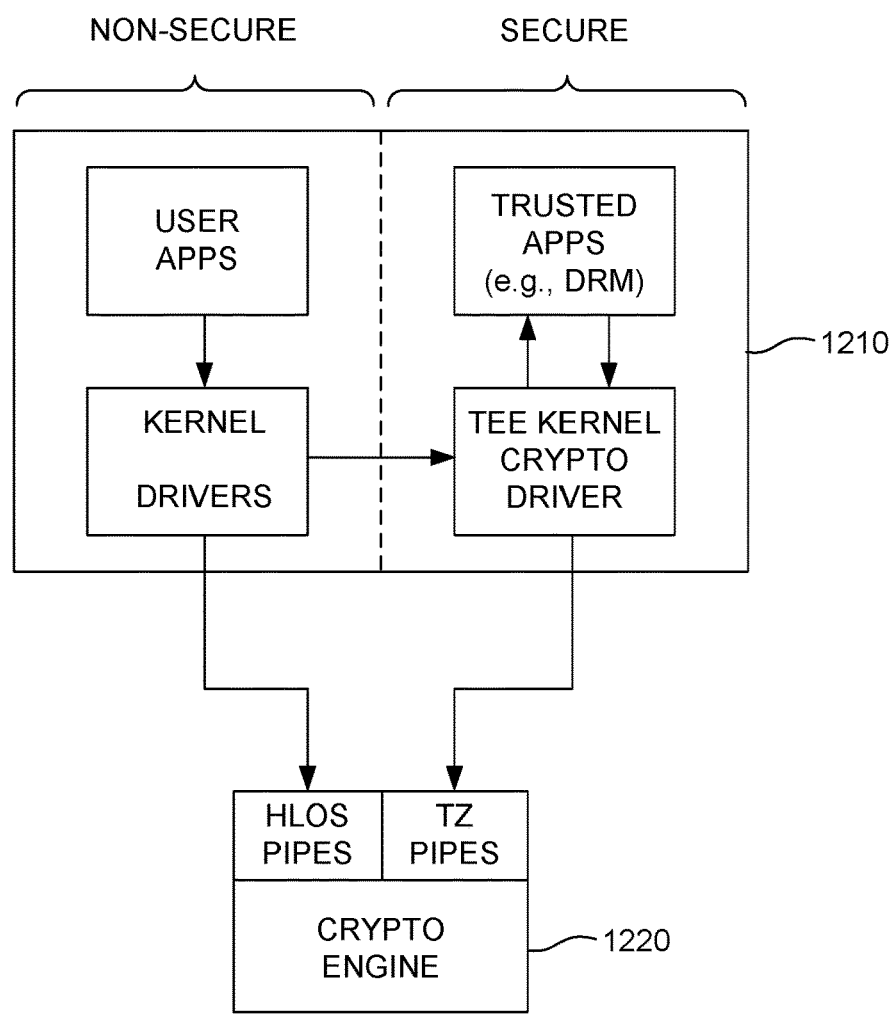
FIG. 12 is a block diagram of a hardware crypto engine and a central processing unit having a secure-zone system architecture.

With reference to FIG. 12, a example of a TEE and a HWCE 1220 is shown. A CPU/processor 1210 may be a system-on-a-chip incorporating ARM's Trust-Zone®. The TEE has a non-secure zone for user applications, and a kernel and drivers for the HLOS. A user application may make calls to the HWCE through HLOS pipes. The TEE also has a secure zone for trusted applications, such a DRM, and a TEE kernel and a crypto driver. The trusted application may make calls to the HWCE through TZ pipes.

In an alternative aspect of the invention, the data blocks may be sequentially sorted. Encrypted data blocks 1SB-1 through 1SB-3 may be copied into the first buffer portion 330, and skipped data blocks 1SB-4 through 1SB-10 may be copied into the second buffer portion 340, as shown in FIG. 13. Next, the encrypted data blocks, 2SB-1 through 2SB-3 may be copied into the first buffer portion, and skipped data blocks 2SB-4 through 2SB-10 may be copied into the second buffer portion 340, as shown in FIG. 14. Finally, encrypted data blocks, 3SB-1 and 3SB-2, may be copied into the first buffer portion, as shown in FIG. 15.

Figure 16:
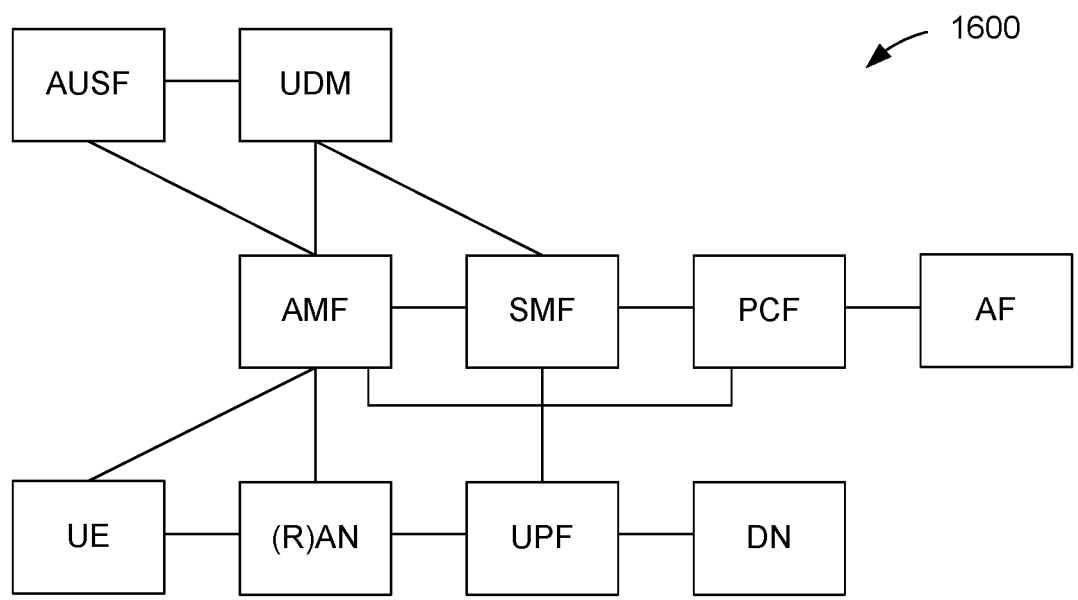
FIG. 16 is a block diagram of a system architecture of a wireless network infrastructure.

FIG. 16 shows the system architecture 1600 of a next generation wireless network infrastructure (i.e., 5G). A User Equipment (UE), e.g., computer 200, may be connected to either an Access Network (AN) or a Radio AN ((R)AN) as well as an Access and Mobility Function (AMF). The RAN represents a base station using, for example, evolved LTE while an AN is a general base station including non-3GPP access, e.g., Wi-Fi. The core network generally may include the AMF, a Session Management Function (SMF), a Policy Control Function (PCF), an Application Function (AF), an Authentication Server Function (AUSF), a User Plane Function (UPF), a User Data Management (UDM), and a Data Network connection (DN). More details regarding may be found in 3GPP TS 23.501: "System Architecture for the 5G System".

A typical wireless mobile station/UE may include a handheld phone, or a laptop computer. The wireless communication system may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. The code may be executed by the processor of the computer. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for decrypting data blocks, comprising:
    receiving, by a processor, a frame of data blocks, wherein the frame includes a plurality of pattern-encrypted subsamples, and each pattern-encrypted subsample includes one or more encrypted data blocks and one or more unencrypted data blocks in accordance with a predetermined pattern;
    determining, by the processor, a first buffer portion and a second buffer portion based on a number of the data blocks in the frame and the predetermined pattern;
    sorting, by the processor, the data blocks by copying the encrypted data blocks into adjacent storage locations in the first buffer portion in accordance with an order of the encrypted data blocks in the frame; and
    performing, by the processor, a decryption call to a crypto engine to generate corresponding decrypted data blocks using the sorted encrypted data blocks in the first buffer portion.

2. The method of claim 1, wherein sorting the data blocks further includes copying the unencrypted data blocks into adjacent storage locations in the second data buffer portion in accordance with an order of the unencrypted data blocks in the frame.

3. The method of claim 2, further comprising:
    storing, by the processor, the decrypted data blocks in the first buffer portion in place of the encrypted data blocks; and
    reverse sorting, by the processor, the decrypted data blocks in the first buffer portion and the unencrypted data blocks in the second data buffer portion by copying the decrypted data blocks and the unencrypted data blocks to a sort buffer in accordance with the predetermined data pattern.

4. The method of claim 1, wherein determining the first buffer portion and the second buffer portion includes calculating a sort divider between storage locations of a buffer based on a number of the data blocks in the frame and based on the predetermined pattern.

5. The method of claim 1, wherein the crypto engine is a hardware crypto engine operating in a non-pattern mode.

6. The method of claim 1, wherein the crypto engine is in a secure execution environment.

7. The method of claim 6, wherein the crypto engine is implemented using software in the secure execution environment.

8. The method of claim 1, wherein the predetermined pattern is repeated a predetermined number of times in each pattern-encrypted subsample.

9. The method of claim 1, wherein the processor is implemented in hardware.

10. An apparatus, comprising:
    means for receiving a frame of data blocks, wherein the frame includes a plurality of pattern-encrypted subsamples, and each pattern-encrypted subsample includes one or more encrypted data blocks and one or more unencrypted data blocks in accordance with a predetermined pattern;
    means for determining a first buffer portion and a second buffer portion based on a number of the data blocks in the frame and the predetermined pattern;
    means for sorting the data blocks by copying the encrypted data blocks into adjacent storage locations in the first buffer portion in accordance with an order of the encrypted data blocks in the frame; and
    means for performing a decryption call to a crypto engine to generate corresponding decrypted data blocks using the sorted encrypted data blocks in the first buffer portion.

11. The apparatus of claim 10, wherein the means for sorting further includes sorting the data blocks by copying the unencrypted data blocks into adjacent storage locations in the second data buffer portion in accordance with an order of the unencrypted data blocks in the frame.

12. The apparatus of claim 11, further comprising:
means for storing the decrypted data blocks in the first buffer portion in place of the encrypted data blocks; and
means for reverse sorting the decrypted data blocks in the first buffer portion and the unencrypted data blocks in the second data buffer portion by copying the decrypted data blocks and the unencrypted data blocks to a sort buffer in accordance with the predetermined data pattern.

13. The apparatus of claim 10, wherein the means for determining the first buffer portion and the second buffer portion includes means for calculating a sort divider between storage locations of a buffer based on a number of the data blocks in the frame and based on the predetermined pattern.

14. The apparatus of claim 10, wherein the crypto engine is a hardware crypto engine operating in a non-pattern mode.

15. An apparatus, comprising:
a processor; and
a non-transitory computer-readable medium comprising instructions executable by the processor, wherein when the processor executes the instructions, the processor is configured to:
receive a frame of data blocks, wherein the frame includes a plurality of pattern-encrypted subsamples, and each pattern-encrypted subsample includes one or more encrypted data blocks and one or more unencrypted data blocks in accordance with a predetermined pattern;
determine a first buffer portion and a second buffer portion based on a number of the data blocks in the frame and the predetermined pattern;
sort the data blocks by copying the encrypted data blocks into adjacent storage locations in the first buffer portion in accordance with an order of the encrypted data blocks in the frame; and
perform a decryption call to a crypto engine to generate corresponding decrypted data blocks using the sorted encrypted data blocks in the first buffer portion.

16. The apparatus of claim 15, wherein the processor is further configured to sort the data blocks by copying the unencrypted data blocks into adjacent storage locations in the second data buffer portion in accordance with an order of the unencrypted data blocks in the frame.

17. The apparatus of claim 16, wherein the processor is further configured to:
store the decrypted data blocks in the first buffer portion in place of the encrypted data blocks; and
reverse sort the decrypted data blocks in the first buffer portion and the unencrypted data blocks in the second data buffer portion by copying the decrypted data blocks and the unencrypted data blocks to a sort buffer in accordance with the predetermined data pattern.

18. The apparatus of claim 15, wherein to determine the first buffer portion and the second buffer portion includes to calculate a sort divider between storage locations of a buffer based on a number of the data blocks in the frame and based on the predetermined pattern.

19. The apparatus of claim 15, wherein the crypto engine is a hardware crypto engine operating in a non-pattern mode.

20. The apparatus of claim 15, wherein the crypto engine is in a secure execution environment.

21. The apparatus of claim 20, wherein the crypto engine is implemented using software in the secure execution environment.

22. The apparatus of claim 15, wherein the predetermined pattern is repeated a predetermined number of times in each pattern-encrypted subsample.

23. A non-transitory computer-readable medium, comprising:
code for causing a computer to receive a frame of data blocks, wherein the frame includes a plurality of pattern-encrypted subsamples, and each pattern-encrypted subsample includes one or more encrypted data blocks and one or more unencrypted data blocks in accordance with a predetermined pattern;
code for causing the computer to determine a first buffer portion and a second buffer portion based on a number of the data blocks in the frame and the predetermined pattern;
code for causing the computer to sort the data blocks by copying the encrypted data blocks into adjacent storage locations in the first buffer portion in accordance with an order of the encrypted data blocks in the frame; and
code for causing the computer to perform a decryption call to a crypto engine to generate corresponding decrypted data blocks using the sorted encrypted data blocks in the first buffer portion.

24. The non-transitory computer-readable medium of claim 23, further comprising code for causing the computer to sort the data blocks by copying the unencrypted data blocks into adjacent storage locations in the second data buffer portion in accordance with an order of the unencrypted data blocks in the frame.

25. The non-transitory computer-readable medium of claim 24, further comprising:
code for causing a computer to store the decrypted data blocks in the first buffer portion in place of the encrypted data blocks; and
code for causing a computer to reverse sort the decrypted data blocks in the first buffer portion and the unencrypted data blocks in the second data buffer portion by copying the decrypted data blocks and the unencrypted data blocks to a sort buffer in accordance with the predetermined data pattern.

26. The non-transitory computer-readable medium of claim 23, wherein code for causing a computer to determine the first buffer portion and the second buffer portion includes code for causing a computer to calculate a sort divider between storage locations of a buffer based on a number of the data blocks in the frame and based on the predetermined pattern.

27. The non-transitory computer-readable medium of claim 23, wherein the predetermined pattern is repeated a predetermined number of times in each pattern-encrypted subsample.

* * * * *